C. A. LITTLETON.
FRUIT CATCHER.
APPLICATION FILED JAN. 8, 1913.

1,111,597.

Patented Sept. 22, 1914.
2 SHEETS—SHEET 1.

Witnesses

Inventor
C. A. Littleton,
By Victor J. Evans
Attorney

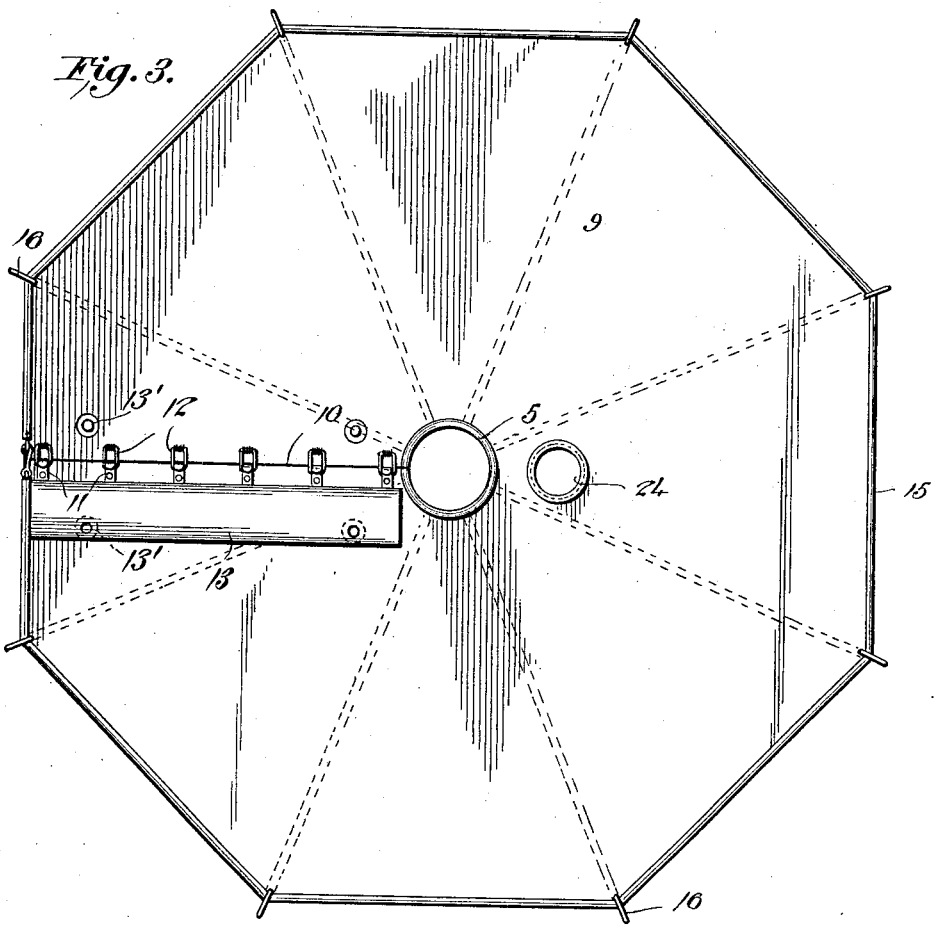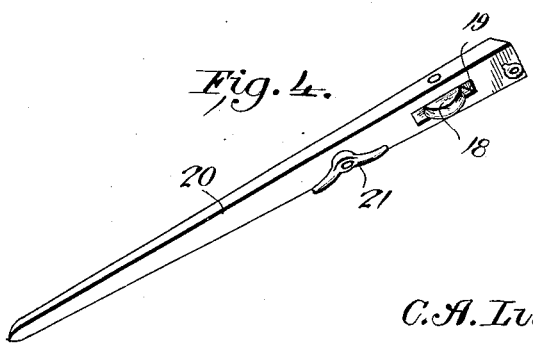

UNITED STATES PATENT OFFICE.

CHARLIE A. LITTLETON, OF YACOLT, WASHINGTON.

FRUIT-CATCHER.

1,111,597.  Specification of Letters Patent.  Patented Sept. 22, 1914.

Application filed January 8, 1913. Serial No. 740,849.

*To all whom it may concern:*

Be it known that I, CHARLIE A. LITTLETON, a citizen of the United States, residing at Yacolt, in the county of Clarke and State of Washington, have invented new and useful Improvements in Fruit-Catchers, of which the following is a specification.

The invention relates generally to a fruit catcher and particularly to a device of this class which is constructed to be conveniently portable with the parts arranged so that it may be readily set up about the tree from which the fruit is to be taken or removed therefrom and folded into a compact form for storage.

The main object of the present invention is the provision of a fruit catcher designed to be set up about the tree and to receive all of the fruit taken from the tree, the construction of the catcher being such as to prevent bruising of the fruit and to direct it to the central aperture from which it is delivered into suitable receptacles.

Figure 1:
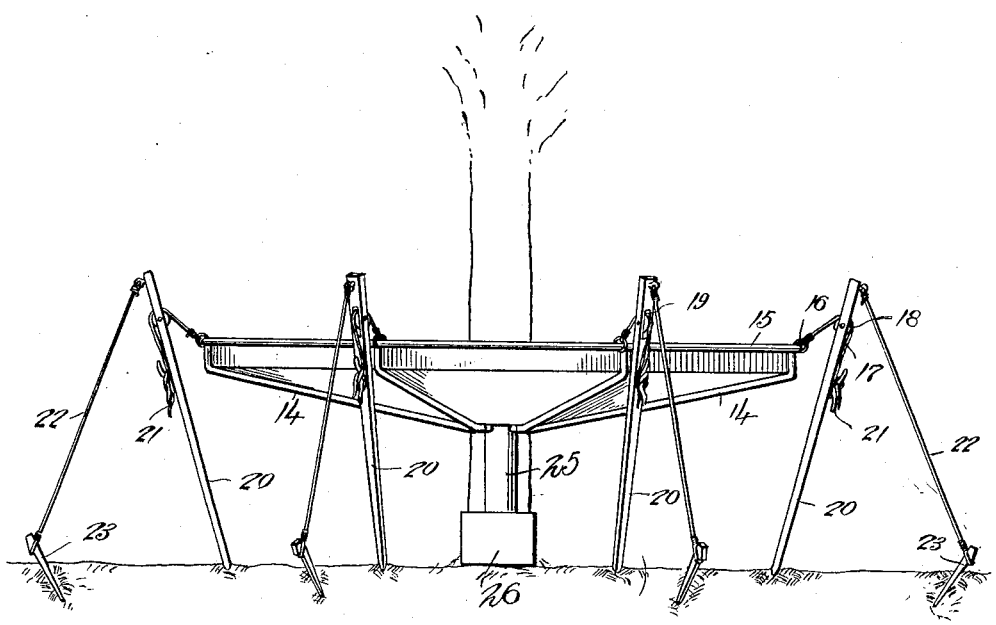
Figure 2:
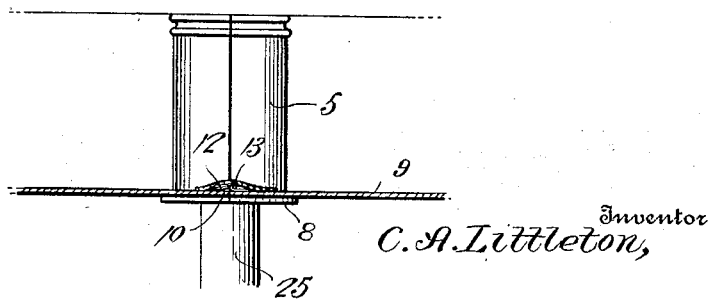

The invention in its preferred form of details will be described in the following specification, reference being had to the accompanying drawings, in which:

Figure 1 is a side elevation of the catcher showing the same in operative position. Fig. 2 is a fragmentary vertical longitudinal sectional view thereof. Fig. 3 is a top plan view. Fig. 4 is a detail perspective of one of the stay rods used in connection with the invention.

Referring particularly to the accompanying drawings the improved fruit catcher comprises a supporting collar arranged to form a connection between the fruit catcher proper and the tree. The collar 5 is a cylindrical body of relatively stiff material, such as leather, longitudinally split to provide for it being properly positioned about the tree and provided at its base with laterally projecting annular flange 8.

The catcher proper comprises a canvas or other fabric body which will be hereinafter termed the apron and which is centrally secured to the annular flange 8 of the collar and divided along a radial line, as at 10, preferably alined with the split division of the collar in order that the apron may be readily positioned about the tree. One of the meeting edges of the line of division of the apron is provided with a plurality of hooks 11 designed to coöperate with eyes secured to the opposing meeting edge whereby the apron presents practically unbroken surface concentric with the collar. To more effectively close the line of divison of the apron and at the same time prevent their coming into contact with the hooks and eyes I provide one edge of the division with a flap 13, which when the edges are hooked together is designed to be turned over and rest above said hooks, ordinary glove button connectors 13' being provided and arranged to secure the flap in such position. The apron is provided with a plurality of radially disposed supporting cords 14 and a peripheral binding cord 15, which cords are designed to materially stiffen the apron to prevent undue sagging thereof in supporting the fruit delivered thereto. At intervals about the periphery of the apron, preferably at the terminals of the radial cords the binding cord 15 is provided with a series of rings 16 to each of which is connected adjusting ropes 17.

The apron is designed to be supported on an upwardly inclined plane from the collar, and to secure such results I provide stay rods 20 provided near the upper ends with a pulley 18 mounted in slots 19 and adjacent pulleys with cleats 21 the lower end of the stay rod being formed to be driven into the ground. The extreme upper ends of the stay rods have connected thereto guy wires 22 the opposite end of which wires are connected to stakes adapted to be driven in the ground remote from the stay rods. By this means a frame support consisting of a series of stay rods is provided beyond the free edge of the apron and by passing the rods 17 connected to the rings 16 of the apron through the slots 19 and over the pulleys 18 and connecting them to the cleats 20 the apron is supported in comparatively taut condition.

Immediately adjacent the collar 5 the apron 9 is formed with an opening 24, and it supports a spout 25 in communication with the opening and depending below the apron.

In the use of the device after the apron has been connected to the particular tree the fruit of such tree is shaken or otherwise dislodged and falls into the apron, gravitating along the latter to the discharge opening 24 and through the spout 25 into any suitable receptacle, as 26, which may be placed beneath the spout for filling.

When not in use the improved device may be readily separated from the tree and folded into a comparatively small bundle for storage or into a more or less compact bundle for transportation to and coöperation with another tree.

What is claimed is:—

A fruit catcher comprising an upstanding collar adapted to surround the trunk of a tree and having an annular flange at the base thereof, an apron secured at its inner edge to said flange and having a radially extending opening, means extending longitudinally of the said opening for connecting the adjacent edges of the opening together, a flap extending longitudinally of said opening and adapted to cover the same, complementary means carried by the flap and apron to secure the flap in an operative position to cover the opening in the apron, said securing means being wholly covered by the flap, means connected to the outer periphery of said apron for supporting the same in position, and a spout depending from said apron adjacent the collar.

In testimony whereof I affix my signature in presence of two witnesses.

CHARLIE A. LITTLETON.

Witnesses:
R. BURNHAM,
C. W. KNOWLES.

Copies of this patent may be obtained for five cents each, by addressing the "Commissioner of Patents, Washington, D. C."